US008451133B2

(12) United States Patent
Lavene et al.

(10) Patent No.: US 8,451,133 B2
(45) Date of Patent: May 28, 2013

(54) LARGE CURRENT CARRYING CAPACITOR HAVING A THERMAL DISCONNECT WITH A LIGHT INDICATOR

(75) Inventors: Bernard Lavene, Ocean, NJ (US); David Curto, Toms River, NJ (US); Alan Schach, Forked River, NJ (US)

(73) Assignee: Electronic Concepts, Inc., Eatontown, NJ (US)

( * ) Notice: Subject to any disclaimer, the term of this patent is extended or adjusted under 35 U.S.C. 154(b) by 964 days.

(21) Appl. No.: 12/537,467

(22) Filed: Aug. 7, 2009

(65) Prior Publication Data

US 2011/0032108 A1 Feb. 10, 2011

(51) Int. Cl.
  *G08B 17/06* (2006.01)
  *H01G 2/14* (2006.01)
  *H01G 9/10* (2006.01)
  *H01G 4/32* (2006.01)
  *H01G 4/00* (2006.01)
  *H01G 2/12* (2006.01)

(52) U.S. Cl.
  USPC ..... 340/593; 361/274.1; 361/518; 361/301.5; 361/301.3; 361/15; 257/298

(58) Field of Classification Search
  USPC .................... 340/593; 361/274.1, 518, 301.5, 361/301.3, 15; 257/298
  See application file for complete search history.

(56) References Cited

U.S. PATENT DOCUMENTS

| 3,046,374 A | 7/1962 | Wright |
| 3,236,976 A | 2/1966 | Rayno |
| 3,396,319 A | 8/1968 | Robinson |
| 3,562,586 A * | 2/1971 | Carter et al. ..................... 361/16 |
| 4,184,139 A | 1/1980 | Hara |
| 4,217,532 A * | 8/1980 | Alfieri et al. .................. 318/759 |

(Continued)

FOREIGN PATENT DOCUMENTS

| EP | 0168 370 A1 | 1/1986 |
| GB | 2 021 318 A | 11/1979 |

(Continued)

OTHER PUBLICATIONS

European Search Report, Appln. No. 07110732.0-2214 dated Oct. 24, 2007.

(Continued)

*Primary Examiner* — George Bugg
*Assistant Examiner* — Jack K Wang
(74) *Attorney, Agent, or Firm* — Ratnerprestia (57) ABSTRACT

A capacitor providing a thermal alert includes a wound film capacitor for carrying a large current when coupled to an AC generator. The wound film capacitor includes a hollow core extending from one end to another end of the capacitor. Also included are an in-line thermal switch, which is disposed in the hollow core for sensing a predetermined temperature; and a light indicator, which is coupled to the thermal switch. A single housing is integrally formed from an upper cover and a lower cover for housing the capacitor, the thermal switch and the light indicator. The upper cover of the housing is formed from translucent material. The thermal switch is configured to disconnect the wound film capacitor from the AC generator upon reaching the predetermined temperature, and activate the light indicator to emit a light. The upper cover is effective in transmitting the light from inside the housing to outside of the housing. The light indicator includes an incandescent light bulb, a neon bulb, or a light emitting diode (LED).

17 Claims, 12 Drawing Sheets

U.S. PATENT DOCUMENTS

| | | |
|---|---|---|
| 4,378,620 A | 4/1983 | Lavene |
| 4,422,127 A | 12/1983 | Lavene |
| 4,455,591 A | 6/1984 | Lavene |
| 4,470,097 A | 9/1984 | Lavene |
| 4,516,187 A | 5/1985 | Lavene |
| 4,538,205 A | 8/1985 | Lavene |
| 4,547,832 A | 10/1985 | Lavene |
| 4,603,373 A | 7/1986 | Lavene |
| 4,614,995 A | 9/1986 | Lavene |
| 4,633,365 A | 12/1986 | Stockman |
| 4,635,163 A | 1/1987 | Voglaire |
| 4,685,026 A | 8/1987 | Lavene |
| 4,719,539 A | 1/1988 | Lavene |
| 4,791,529 A | 12/1988 | Duncan et al. |
| 4,980,798 A | 12/1990 | Lavene |
| 5,032,950 A | 7/1991 | Lavene |
| 5,371,650 A | 12/1994 | Lavene |
| 5,493,472 A | 2/1996 | Lavene |
| 5,608,600 A | 3/1997 | Lavene |
| 5,610,796 A | 3/1997 | Lavene |
| 5,614,111 A | 3/1997 | Lavene |
| 5,638,250 A | 6/1997 | Oravala |
| 5,770,993 A | 6/1998 | Miyazawa et al. |
| 6,111,743 A | 8/2000 | Lavene |
| 6,819,545 B1 | 11/2004 | Lobo et al. |
| 7,471,498 B2 | 12/2008 | Lavene et al. |
| 2001/0012732 A1 | 8/2001 | Kitchens |
| 2001/0014005 A1 | 8/2001 | Nakamura |
| 2003/0197614 A1* | 10/2003 | Smith et al. ............ 340/573.1 |
| 2004/0232465 A1 | 11/2004 | Shiota et al. |
| 2004/0250393 A1 | 12/2004 | Mandelcorn et al. |
| 2006/0104006 A1 | 5/2006 | Saito |
| 2007/0030624 A1 | 2/2007 | Hosking |
| 2007/0217124 A1 | 9/2007 | Lavene |
| 2008/0002311 A1* | 1/2008 | Bond ........................ 361/15 |
| 2008/0203416 A1* | 8/2008 | Konishi et al. ............ 257/98 |

FOREIGN PATENT DOCUMENTS

| | | |
|---|---|---|
| JP | 6-275455 | 9/1994 |
| JP | 10-027724 A | 1/1998 |
| JP | 2003-264116 A | 9/2003 |
| KR | 2003-0039244 | 5/2003 |
| UA | 67 922 A | 7/2004 |
| WO | WO 2007/109061 A2 | 9/2007 |

OTHER PUBLICATIONS

Sinclair, David M., USPTO, Official Action of U.S. Appl. No. 11/717,328, Feb. 21, 2008.

Sinclair, David M., USPTO, Official Action of U.S. Appl. No. 11/717,328, Jul. 3, 2008.

Thomas, Eric W., USPTO, Official Action of U.S. Appl. No. 11/717,331, Apr. 16, 2008.

International Search Report dated Apr. 19, 2011.

Written Opinion dated Apr. 19, 2011.

International Preliminary Report on Patentability for PCT/US2007/006456, Authorized officer Masashi Honda, Sep. 16, 2008.

* cited by examiner

LARGE CURRENT CARRYING CAPACITOR HAVING A THERMAL DISCONNECT WITH A LIGHT INDICATOR

TECHNICAL FIELD

The present invention relates, in general, to a wound film capacitor for carrying a large current and having an in-line thermal disconnect device disposed at a hot spot of the capacitor. More specifically, the present invention relates to a wound film capacitor having a thermal in-line switch disposed within a hollow core of the capacitor, in which the thermal switch is coupled to a light indicator to provide a visual alert from the capacitor that a predetermined hot temperature has been reached.

BACKGROUND OF THE INVENTION

U.S. Pat. No. 7,471,498, issued on Dec. 30, 2008 to the present inventors, describes a high current carrying capacitor with a thermal disconnect device. The Patent in its entirety is incorporated herein by reference and FIGS. 1, 2 and 3 of that Patent are also described below.

Figure 1:
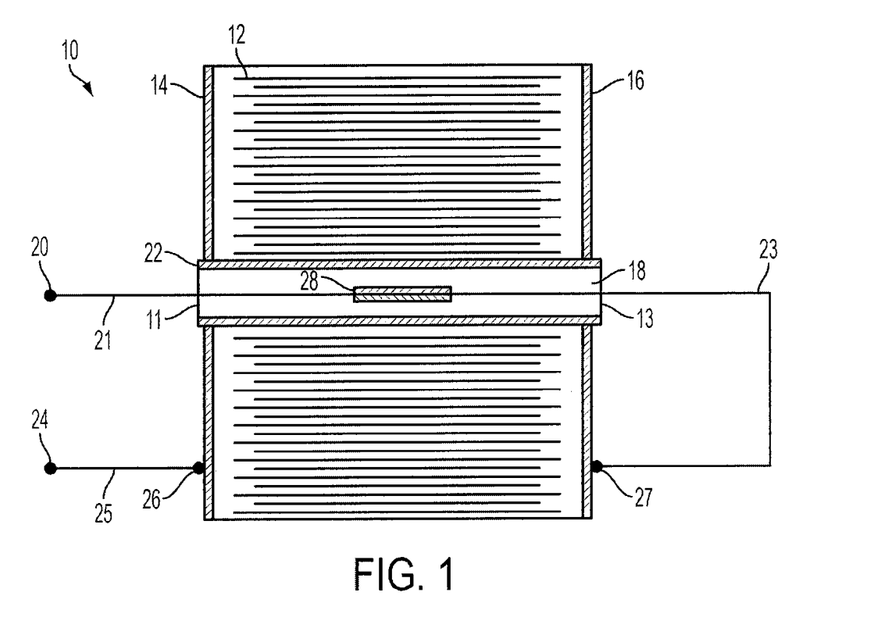
FIG. 1 is a cross sectional view of a wound film capacitor including a thermal cutoff device.
Figure 2:
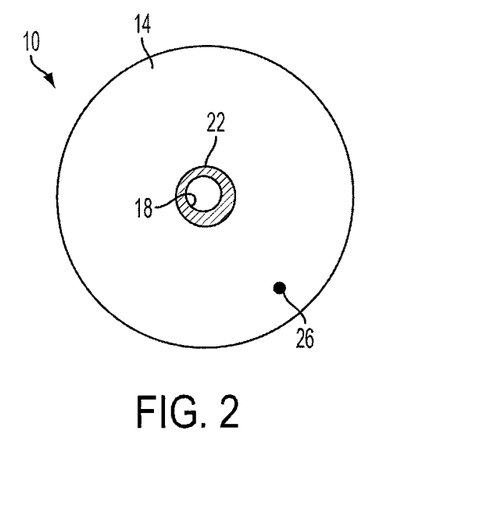
FIG. 2 is a side view of the wound film capacitor shown in FIG. 1 with the thermal cutoff device having been removed.
Figure 3:
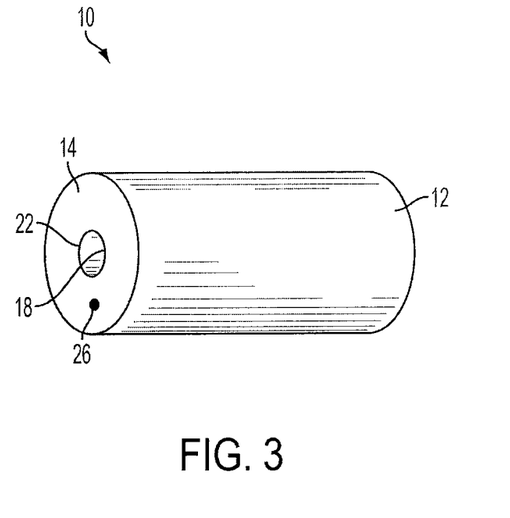
FIG. 3 is a perspective view of the wound film capacitor shown in FIG. 1 with the thermal cutoff device having been removed.

Referring to FIGS. 1, 2 and 3, there is shown a high current carrying capacitor, generally designated as 10. Capacitor 10 includes hollow core 18 surrounded by capacitor winding 12. Hollow core 18 is formed by a non-conducting tubular section 22 which extends slightly beyond the ends of capacitor winding 12. At opposite ends of capacitor winding 12 are two metallization layers 14 and 16.

On completion of winding 12 of the capacitor roll, the ends of capacitor winding 12 may be sprayed with a high velocity mixture of compressed air and molten fine particles of tin produced from an electric arc gun. This spray forms opposing metallization layers 14 and 16, which may be considered electrically the same as opposing first and second terminals of the capacitor. Wire leads 23 and 25 may then each be bonded to respective metallization layers 16 and 14 by way of solder terminals 26 and 27. Metallization layers 14 and 16 completely encircle the outer circumferences of the capacitor roll.

Capacitor winding 12 is wound around tubular section 22 in conventional manner. Hollow core 18 may be trimmed to extend approximately 0.2 to 0.3 inches beyond metallization layers 14 and 16, thereby forming core extensions or collars 11 and 13. The core extensions, however, are not necessary.

As best shown in FIG. 2, tubular section 22 includes an inner surface forming the hollow core. This inner surface may be used for anchoring the tubular section to a winding machine. The tubular section is then used as a mandrel for winding the film capacitor into a roll.

Fuse 28 together with wire leads 21 and 23 are inserted into hollow core 18. As shown, fuse 28 is in a closed position which permits electrical current to flow from wire lead 21 to wire lead 23. In turn, electrical current may flow from wire lead 23 to metallization layer 16 and into a first end metallic winding of capacitor 10 by way of solder terminal 27. Furthermore, electrical current may flow from a second end metallic winding of capacitor 10 to wire lead 25 by way of metallization layer 14 and solder terminal 26. In this manner, when fuse 28 is in a closed position, capacitor 10 permits current to flow between terminals 20 and 24.

Tubular section 22 may be formed from a non-conductive material, such as polypropylene. Tubular section 22 forms a continuous passageway through the entire length of hollow core 18. As an example, the diameter of hollow core 18 may be approximately ½ an inch.

When electric current is passed through capacitor winding 12, thermal energy is generated raising the temperature of capacitor winding 12. The hottest region of capacitor winding 12 is at its geometric center. The geometric center includes the region containing tubular section 22 and is located at the radial center and the axial center of the hollow core. Thus, hollow core 18 passes directly through the region containing the highest temperature within capacitor winding 12. This region is also referred to herein as the hot spot of the capacitor winding.

Fuse 28 is disposed at the middle of the axial length of hollow core 18. In this manner, fuse 28 senses the highest temperature, or the hot spot of capacitor winding 12. As shown in FIG. 1, fuse 28 is suspended within hollow core 18, without need to fasten the fuse to any portion of the tubular section. The fuse may be centrally positioned within hollow core 18 with the aid of wire leads 21 and 23.

The present invention includes a thermal switch (also referred to herein as a fuse, or a thermal cutoff device) for a wound film capacitor, which is different from the prior art, as described below. The present invention also includes a light indicator which is controlled by the thermal switch and provides a visual alert to a user.

SUMMARY OF THE INVENTION

To meet this and other needs, and in view of its purposes, the present invention provides a capacitor with an in-line thermal alert including:

(a) a wound film capacitor for carrying a large current when coupled to an AC generator, and the wound film capacitor including a hollow core extending from one end to another end of the capacitor;

(b) a thermal switch disposed in the hollow core for sensing a predetermined temperature;

(c) a light indicator coupled to the thermal switch; and (d) a housing integrally formed from an upper cover and a lower cover for housing the wound film capacitor, the thermal switch and the light indicator.

The upper cover of the housing is formed from translucent material. The thermal switch is configured to disconnect the wound film capacitor from the AC generator upon reaching the predetermined temperature, and activate the light indicator to emit a light. The upper cover is effective in transmitting the light from inside the housing to outside of the housing.

The light indicator is disposed inside the housing and inside an interior portion of the upper cover. The light indicator may include an incandescent light bulb, a neon bulb, or a light emitting diode (LED). The light indicator may be powered ON by an AC generator, or a DC battery.

The thermal switch and the light indicator are fixed into positions within the housing by a translucent resin epoxy inserted into the housing. A reflector is circumferentially positioned at a radial distance from the light indicator, so that the reflector is effective in amplifying the light emitted from the light indicator.

The thermal switch includes a first end connected by a first conductor to the AC generator and a second end connected by a second conductor to the wound film capacitor. The first and second conductors are wide strips of flexible metal for conducting a current of at least 50 amperes to the switch. The first and second conductors include first double strips and second double strips, respectively, and the first double strips include first and second strip end portions. The thermal switch includes first and second springing arms positioned to urge the first and second strip end portions, respectively, away from the second double strips. The first and second strip end portions are soldered to the second double strips. When the predetermined temperature is reached, the solder melts and the first and second strip end portions are urged away from the second double strips to disconnect the wound film capacitor from the AC generator. The first and second springing arms are formed from beryllium and have a width substantially equal to a width of the first double strips, and a length substantially in contact with a length of the first double strips.

The present invention includes another embodiment having a bank of multiple capacitors providing a thermal alert. Included are a bank of multiple wound film capacitors, each capacitor carrying a large current when coupled to an AC generator, and each capacitor including a hollow core extending from one end to another end of the capacitor. A respective thermal switch is disposed in the hollow core of each of the capacitors for sensing a predetermined temperature. A respective light indicator is coupled to the respective thermal switch. A respective housing is integrally formed from an upper cover and a lower cover for housing each of the capacitors, each of the respective thermal switches and each of the respective light indicators. The upper cover of each of the respective housings is formed from translucent material. Each of the respective thermal switches is configured to disconnect a capacitor from the AC generator upon reaching the predetermined temperature and activate a respective light indicator to emit a respective light. The upper cover of each of the respective housings is effective in transmitting the respective light from inside the respective housing to outside of the respective housing.

The multiple capacitors are electrically connected in at least one of series or parallel connections with the AC generator, and are stacked into an array of the respective housings with the upper cover positioned vertically above the lower cover. The upper cover of each of the respective housings is shaped as an inverted-U, or an inverted bucket, in cross-section. A metallic plate is disposed vertically above the array. The shape of the upper cover permits viewing of an emitted respective light from a vertical position below the metallic plate and from a peripheral side of the array.

The respective light indicator is disposed inside each of the respective housings and within an interior portion of each of the respective upper covers. The respective light indicator may include an incandescent light bulb, a neon bulb, or a light emitting diode (LED). The respective thermal switch and the respective light indicator inside each of the respective housings are fixed into positions by a translucent resin epoxy inserted into each of the respective housings.

The respective thermal switch includes a first end connected by a first conductor to the AC generator and a second end connected by a second conductor to the respective capacitor. The first and second conductors are wide strips of flexible metal for conducting a current of at least 50 amperes to the respective thermal switch. The first and second conductors include first double strips and second double strips, respectively, and the first double strips include first and second strip end portions. The respective thermal switch includes first and second springing arms positioned to urge the first and second strip end portions, respectively, away from the second double strips. The first and second strip end portions are soldered to the second double strips. When the predetermined temperature is reached, the solder melts and the first and second strip end portions are urged away from the second double strips to disconnect the respective capacitor from the AC generator. The first and second strip end portions are soldered to the second double strips. When the predetermined temperature is reached, the solder melts and the first and second strip end portions are urged away from the second double strips and disconnect the wound film capacitor from the AC generator.

Yet another embodiment of the invention includes:

(a) at least one wound film capacitor for carrying a large current when coupled to the AC source, and the wound film capacitor including a hollow core extending from one end to another end of the capacitor, and the capacitor enclosed within a housing;

(b) a double-pole double-throw thermal switch disposed, in-line with the capacitor, and in the hollow core for sensing a predetermined temperature;

(c) two first terminals of the thermal switch operating in a normally closed position and having two first conductor leads configured to provide an AC voltage across the wound film capacitor; and (d) two second terminals of the thermal switch operating in a normally open position and having two second conductor leads extending externally from the housing of the wound film capacitor.

The two first terminals are configured to disconnect the wound film to capacitor from the AC voltage upon reaching the predetermined temperature. The two second terminals are configured to close for enabling a current to flow through the two second conductor leads and provide an external alert to a user.

The wound film capacitor may also be a first capacitor in a plurality of capacitors that are arranged in an array and connected to operate in parallel or in series with the AC source. Each of the plurality of capacitors includes a thermal switch having two first and two second terminals configured in a manner similar to the first capacitor. An external indicator and an external power source are connected to the two second conductor leads for providing the external alert to the user. The thermal switch may include a micro-switch for activating the external indicator.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

The present invention includes a thermal cutoff device, or a thermal switch, with a light indicator for a dry film capacitor. The capacitor may be used in systems generating 300-900 volts AC (for example) and produce as much as 150 amperes (for example). One system that carries such high current is a wind generator. Overheating in such a system may cause a catastrophic failure. As will be explained, the present invention provides a new level of control to potential overheating by providing a thermal switch that disconnects the capacitor upon detecting an over-temperature condition and visually alerts the user to that condition.

Metallized film capacitors, mainly due to self healing of inherent defects, are reliable and long lasting over the life of the product. However, excessive self healings may create an overheating run-away condition, especially in uncontrolled, unmonitored circuits, and fail catastrophically. The present invention provides added insurance against this type of disastrous failure.

In addition, the present invention provides an indication to a user that a specific capacitor has been disconnected, due to detecting a hazardous condition. The indication is provided by a light from an incandescent filament bulb, a neon bulb, or a light emitting diode (LED). As will be explained, upon activation of the thermal switch, the film capacitor is disconnected from the primary power supply, and the light indicator is connected to the primary power supply (or a separate small battery) to provide an alert to the user. In this manner, the user is alerted that the film capacitor has shut-off and the failed capacitor may be rapidly replaced. This is especially advantageous in applications having a ganged array of series and/or parallel connected capacitors, in which it is not readily discernible which specific capacitor has shut-off. As will be explained, the visual light provides a quick means to establish the location of the failed capacitor in the ganged array of multiple capacitors.

Figure 4:
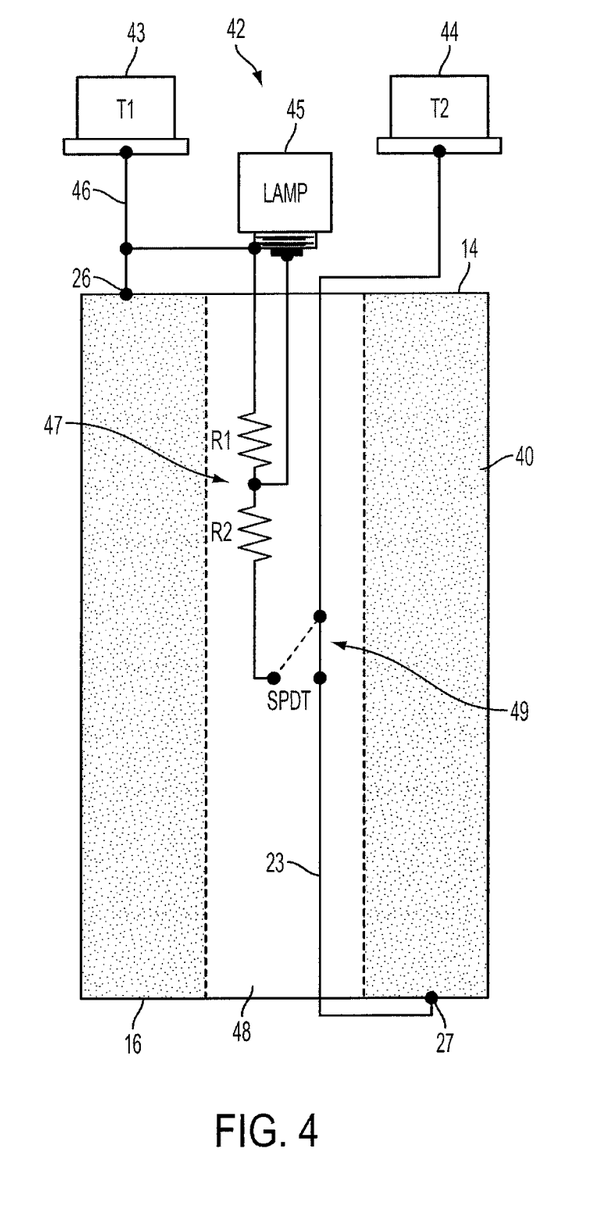
FIG. 4 is a cross sectional view of a wound film capacitor including a schematic view of an in-line thermal switch and a light indicator, in accordance with an embodiment of the present invention.
Figure 5:
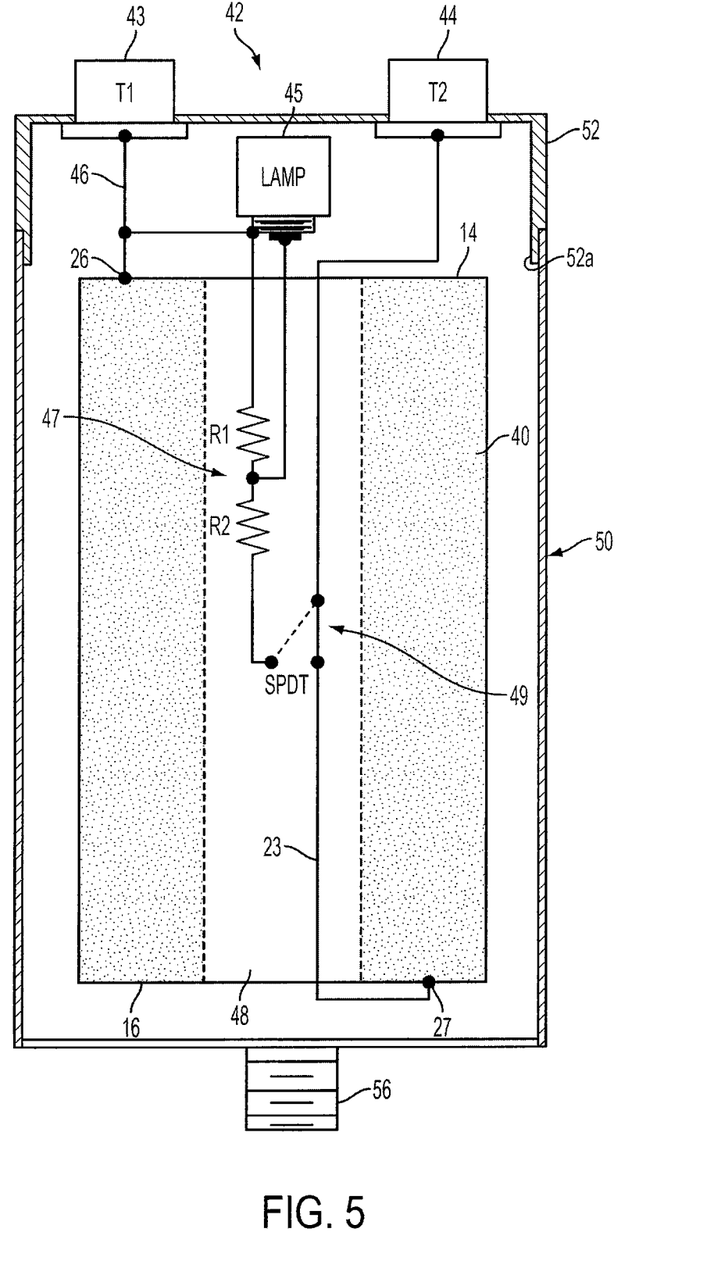
FIG. 5 is a cross sectional view of the wound film capacitor shown in FIG. 4 when housed in a unique single housing having upper and lower covers, in accordance with an embodiment of the present invention.

Referring now to FIGS. 4 and 5, there are shown cross-sectional views of capacitor 40 without its housing (FIG. 4) and capacitor 40 disposed within its housing, generally designated as 50 (FIG. 5). Also shown is a functional schematic of an alert circuit 42, in which some elements of the circuit are disposed within hollow core 48 and the remaining elements are disposed above capacitor 40. FIG. 4 depicts terminals 43 and 44 suspended above capacitor 40, and FIG. 5 depicts the same terminals pressure-fitted through circular openings in the top surface of housing 50, marked as terminals $T_1$ and $T_2$.

The housing 50 includes upper cover 52 which is pressure-fitted into lower cover 54. The lower cover 54 may be formed from a cylindrical aluminum can and the upper cover 52 may be formed from translucent material, such as plastic, and may be cylindrically sized for a pressure fit into lower cover 54. As shown in FIG. 5, as an example, upper cover 52 includes a wall with a protruding collar 52a having a smaller radius than the radius of the wall of lower cover 54. In this manner, upper cover 52 may be removably inserted into lower cover 54, so that the cylindrical wall of upper cover 52 rests upon the cylindrical wall of lower cover 54. The upper cover forms a generally inverted-U configuration, or an inverted bucket. In addition, the outer surfaces of the upper and lower covers may be flush against each other, so that housing 50 has a generally smooth outer surface, and appears as a single, unitary, integral housing.

The present invention provides a translucent upper cover and advantageously permits light emitted from light bulb indicator 45 to be seen externally of housing 50. Furthermore, the present invention may insert a translucent epoxy into the interior of housing 50 that does not prevent transmission of light from light bulb indicator 45 to the exterior of housing 50. Moreover, the present invention may mix a red dye with the translucent epoxy to provide red colorization to the light transmitted from light bulb indicator 45.

It will be appreciated that the epoxy includes a resin that is given time to cure, thereby forming a hard, solid volume within housing 50. In addition, light bulb 45, conductors 46, voltage divider 47 ($R_1$ and $R_2$) and thermal switch 49 of alert circuit 42 may be manually positioned within hollow core 48 and within the interior of upper cover 52, before the epoxy resin hardens and permanently fixes the locations of the elements of alert circuit 42.

Completing description of FIGS. 4 and 5, capacitor 40 includes opposing metallization layers 14 and 16 (similar to metallization layers 14 and 16 shown in FIGS. 1, 2 and 3). Also included are solder terminals 26 and 27 bonded to conductor leads 46 and 23, respectively. Hollow core 48 includes thermal switch 49 and voltage divider 47 comprising resistors $R_1$ and $R_2$. FIG. 5 shows bolt 56 extending from housing 50 which provides attachment means for mounting the bottom of housing 50 onto a plate (for example; not shown), with radial terminals $T_1$ and $T_2$ of capacitor 40 extending vertically above the plate (for example).

Figure 6:
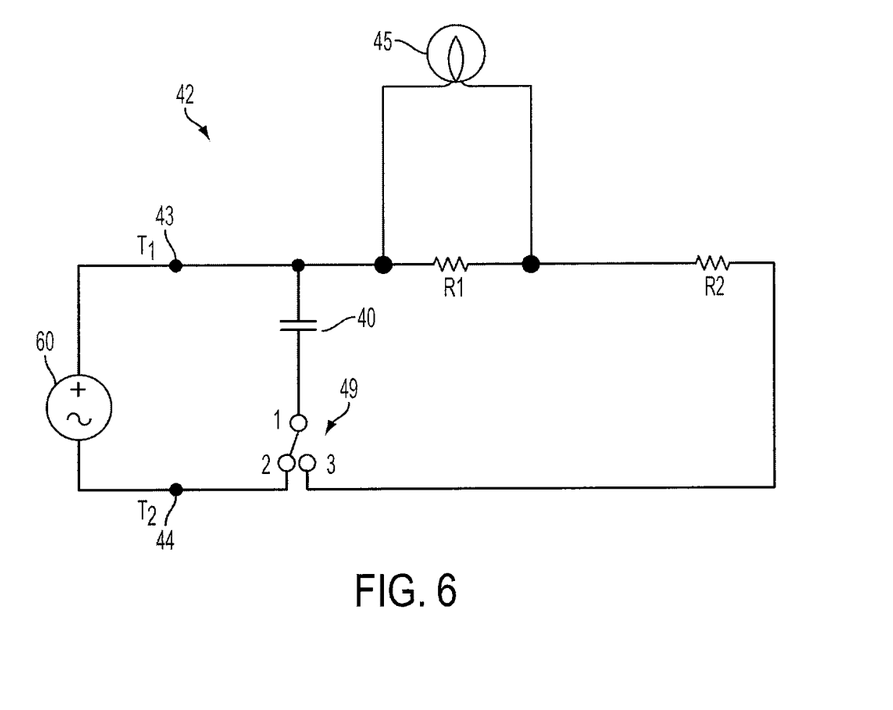
FIG. 6 is a schematic view of a thermal switch and a light indicator coupled to an AC source, in accordance with an embodiment of the present invention.

Various embodiments of circuit 42 including thermal switch 49 will now be described. As shown in FIG. 6, circuit 42 includes alternating current (AC) source 60 connected between terminals $T_1$ and $T_2$ (designated as 43 and 44) of capacitor 40. Inserted between terminal $T_2$ and one end of capacitor 40 is thermal switch 49. Thermal switch 49 is normally closed between switch terminals 1 and 2, so that capacitor 40 may normally operate with AC source 60. Upon a thermal overheating condition, thermal switch 49 opens a contact between switch terminals 1 and 2, and disables capacitor 40. In addition, thermal switch 49 connects switch terminal 1 to switch terminal 3, thereby causing bulb 45 to light. As shown, bulb 45, at one end, is receives a voltage divided between R1 and R2 which is provided by AC source 60. The bulb 45 is connected across R1. This circuit is only intended to be exemplary and, of course, other circuits for activating bulb 45 may be utilized.

Figure 7A:
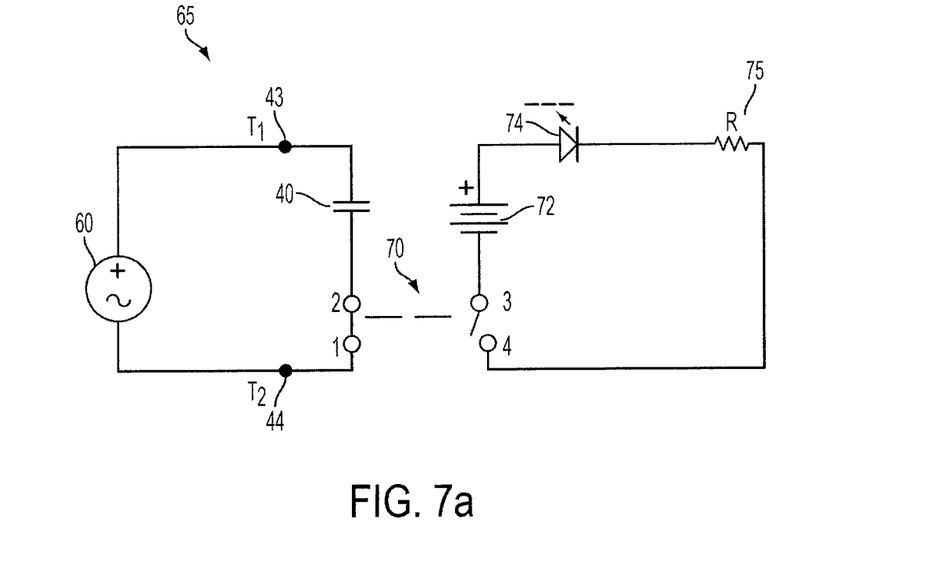
FIG. 7a is a schematic view of a double-pole double-throw thermal switch including a battery and a light indicator for disconnecting an AC source and operating the light indicator with the battery, in accordance with an embodiment of the present invention.
Figure 7B:
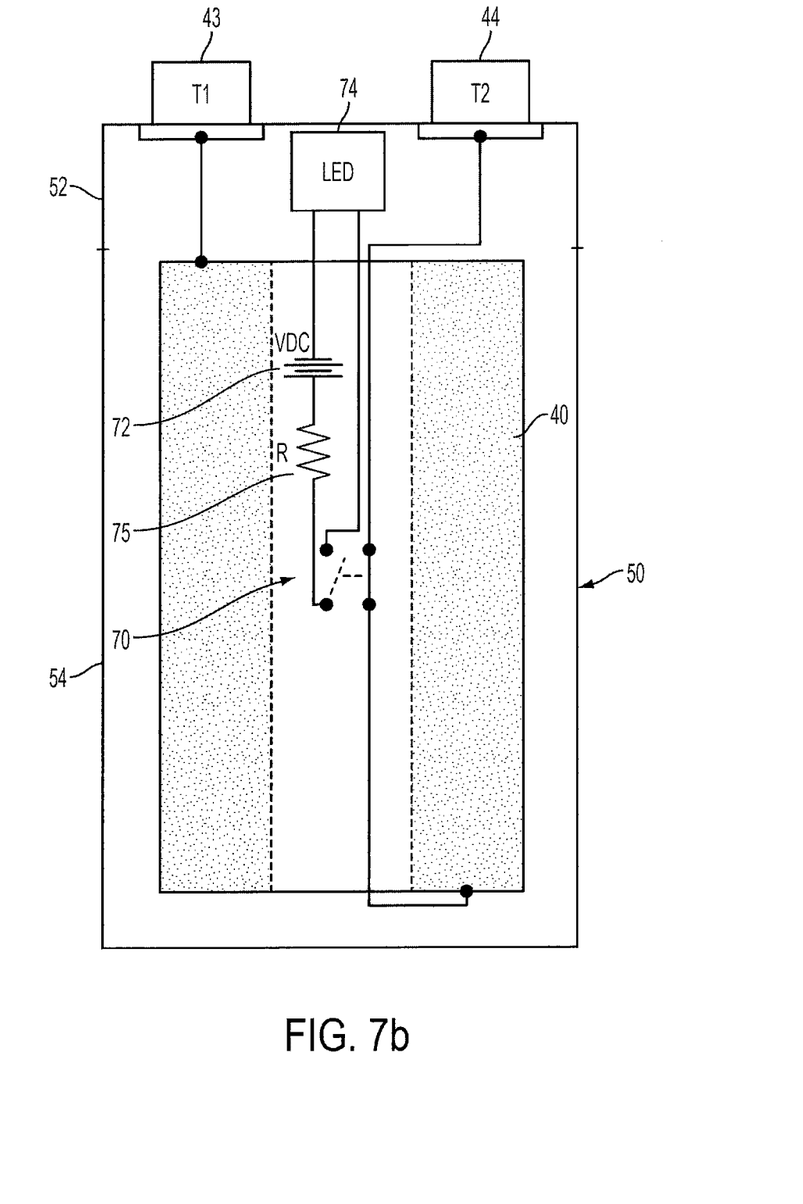
FIG. 7b is a cross sectional view of the double-pole double-throw thermal switch including the battery and light indicator, shown schematically in FIG. 7a, when housed within upper and lower covers of an integral housing, in accordance with an embodiment of the present invention.

Another embodiment of circuit 42 of the present invention is shown in FIG. 7*a*, depicting an alert circuit generally designated as 65. As shown, circuit 65 includes a double pole-double throw thermal switch, generally designated as 70. Thermal switch 70 is normally connected between switch terminals 1 and 2, while switch terminals 3 and 4 are open. In this manner, capacitor 40 is operating normally, as it is connected across AC source 60. If an over-temperature condition occurs, thermal switch 70 disconnects capacitor 40 from the AC source, and connects switch terminal 3 to switch terminal 4. Accordingly, while capacitor 40 is disabled, direct current (DC) battery 72, resistor R 75 and light emitting diode (LED) 74 complete a circuit path and become operational. The LED 74, the battery 72, the resistor 75 and thermal switch 70 are all shown in FIG. 7*b*, as an example, housed within housing 50. The LED 74 emits a light through the translucent upper cover 52 of housing 50 and provides a visual alert to a user that an over-temperature condition of capacitor 40 has occurred.

It will be appreciated that circuit 42 in FIG. 6 requires a voltage from AC source 60 to activate bulb 45 (or neon bulb 45). On the other hand, circuit 65 in FIG. 7*a* does not require power from AC source 60 and, instead, the battery 72 activates LED 74 to provide the alert to the user of the over-temperature condition.

Figure 8:
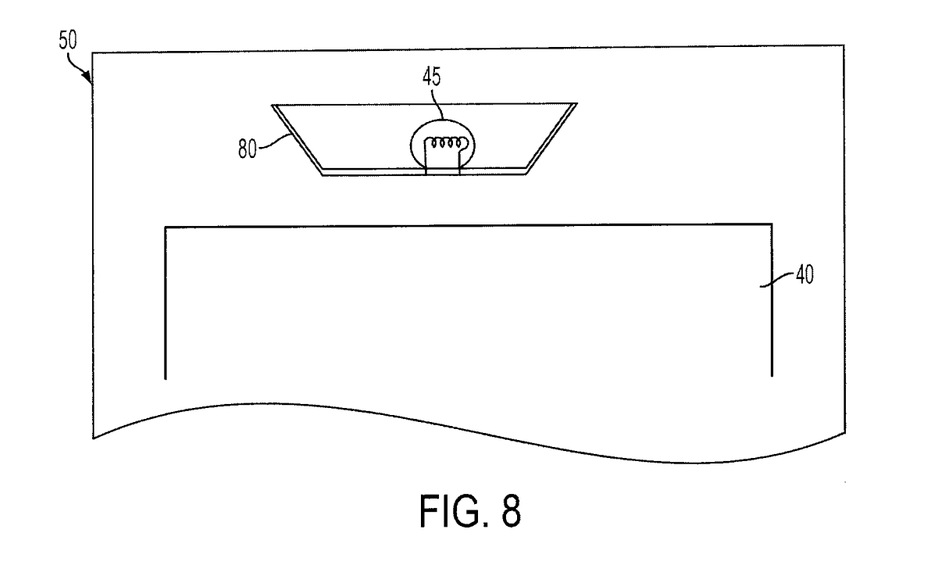
FIG. 8 is a cross sectional view of the housing of a wound film capacitor and a light indicator, including a reflector disposed between the wound film capacitor and the light indicator, in accordance with an embodiment of the present invention.

Referring next to FIG. 8, there is shown another aspect of the present invention, in which bulb 45 is inserted through an opening (not shown) in reflector 80, the latter positioned above capacitor 40 disposed in housing 50. Reflector 80 amplifies or concentrates the light emitted from bulb 45, so that the light may be easily seen by a user viewing the translucent upper cover of housing 50. It will be appreciated that bulb 45 may also be a neon bulb, or an LED, such as LED 74 shown in FIG. 7*b*.

Figure 9A:
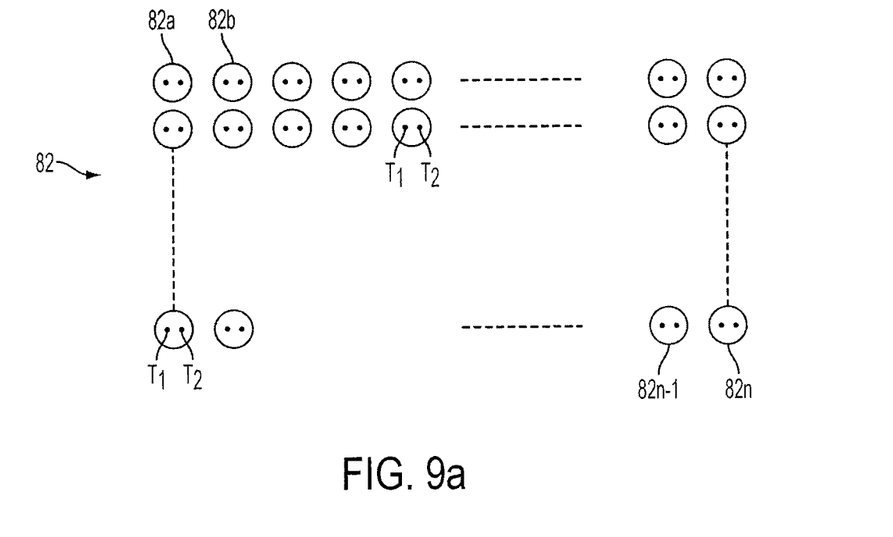
FIGS. 9a and 9b are, respectively, top and side views of an array of capacitors showing a metallic plate disposed above the terminals of the array of capacitors.
Figure 9B:
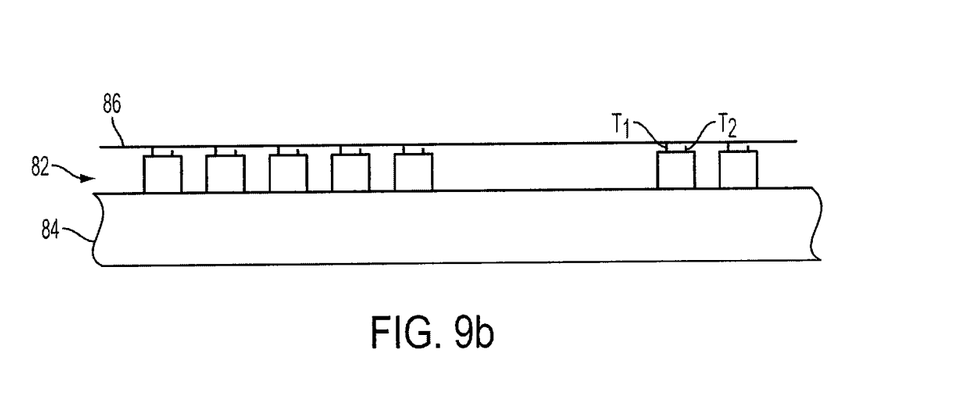

Referring next to FIGS. 9*a* and 9*b*, there is shown an exemplary advantage in using the present invention with a translucent upper cover 52 disposed above capacitor 40 (as shown in FIG. 5). As shown, an array of capacitors 82 are arranged in a series and/or parallel configuration, in which capacitors 82*a*, 82*b*, . . . and 82*n* are shown operating as exemplified by array 82. The array 82 is disposed on top of surface 84. Furthermore, metallic plate 86 is disposed above the terminals of the multiple capacitors in array 82. It will be appreciated that although only one plate 86 is shown disposed above the terminals, there may be two metallic plates disposed one above the other. One metallic plate 86 may be connected to one set of terminals (for example, terminals $T_1$) and another plate (not shown) may be connected to another set of terminals (for example, terminals $T_2$).

Because the metallic plates (for example plate 86) are typically opaque, it is difficult to determine which capacitor in the array of capacitors 82 has experienced an over-temperature condition. However, the embodiments described herein may include capacitors, each having a housing 50 with a translucent upper cover 52, as shown in FIG. 5. With such a translucent upper cover 52, or another shaped translucent upper cover in a capacitor housing, the light emitted from bulb 45 may be seen by viewing the array 82 at a peripheral side of the array and, perhaps, below plate 86. In this manner, a user may be alerted to an over-temperature condition of one of the capacitors in the array. The user may then easily remove plate 86 and replace the capacitor that is emitting the light.

Figure 10A:
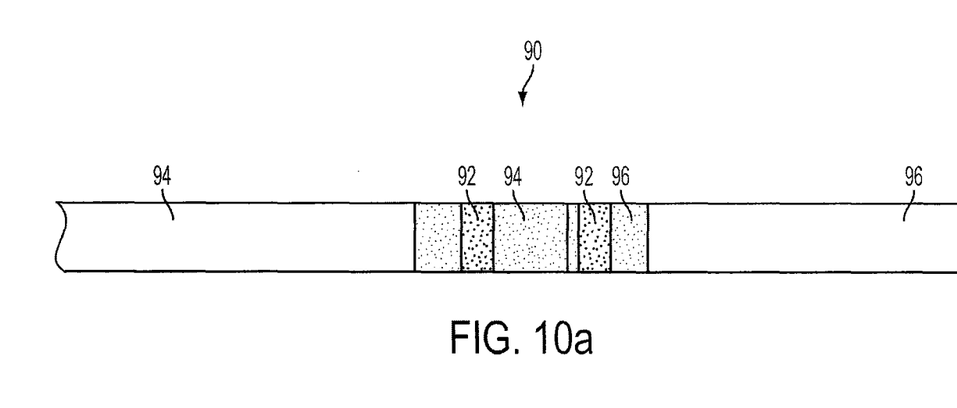
FIGS. 10a and 10b are, respectively, top and side views of a wide thermal switch connected to wide strips of a double set of conductors, the thermal switch including double arms forced into an open position using a natural spring force, in accordance with an embodiment of the present invention.
Figure 10B:
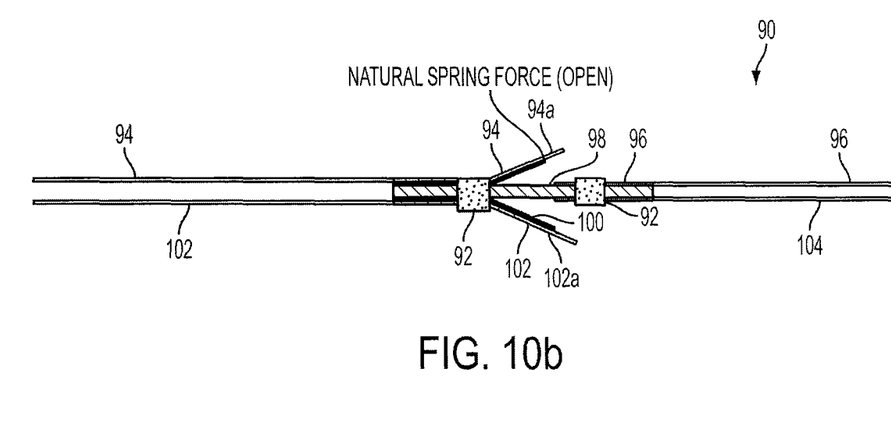

Yet another embodiment of the present invention is shown in FIGS. 10*a* and 10*b* providing wide, double layers of conductor leads connected between terminals $T_1$ and $T_2$ of a capacitor and a thermal switch. This embodiment may be used in operational conditions having a large current flow, for example 100 amperes or higher. As shown, FIG. 10*a* is a top view of thermal switch 90 connected between wide conductor leads 94 and 96. FIG. 10*b* is a side view of thermal switch 90, showing that thermal switch 90 is actually a wide, double layer of conductor leads. As shown, thermal switch 90 is connected between upper conductors 94 and 96 and between lower conductors 102 and 104.

As may be seen, thermal switch 90 is a single pole-double throw switch. When thermal switch 90 is opened (FIG. 10*b*), upper conductor 94 is disconnected from upper conductor 96. Similarly, when thermal switch 90 is opened (FIG. 10*b*), lower conductor 102 is disconnected from lower conductor 104. Thermal switch 90 includes first and second natural springs 100 connected, respectively, to upper conductor 94 at conductor portion 94*a*, and lower conductor 102 at conductor portion 102*a*. When thermal switch 90 is closed, first and second natural springs 100 are forced to be substantially parallel to a non-conducting base, designated as 98. The thermal switch may be forced closed by soldering portion 94*a* and portion 102*a* to upper conductor 96 and lower conductor 104, respectively. Clamps 92 are effective in fixing respective conductors 94, 96, 102 and 104 to non-conducting base 98.

Natural spring 100 may be formed from beryllium copper, which is used to provide the spring force. Once solder solidifies to connect conductor portion 94*a* and conductor portion 102*a* to wide conductors 96 and 104, respectively, there exists a force tending to pull the two arms of the wide conductors apart. This force, or springing action, is due to the natural spring force of spring 100. When conductor portions 94*a* and 102*a* are soldered to respective conductor leads 96 and 104, the natural springs are each in a compressed state, or in a non-rest state. In the position shown in FIG. 10*b*, thermal switch 90 is mechanically opened and is in a rest state. In the rest state, conductors 94 and 102 are not connected to respective conductors 96 and 104.

In operation, thermal switch 90 is triggered for action by soldering wide conductor portions 94*a* and 102*a* with wide conductors 96 and 104, respectively. The thermal switch with its wide soldered conductors may then be placed within hollow core 48 (FIGS. 4 and 5). The thermal switch 90 may be centered at the hot spot of capacitor 40 by using a proper length for each of the conductor leads. The wide conductors 94 and 102 may be fixed, by soldering, to metallization layer 14 (FIGS. 4 and 5) at terminal 27 and another terminal (not shown). The other wide conductors 96 and 104 may be fixed, by soldering, to metallization layer 16 by way of terminal 27 and another terminal (not shown).

It will be appreciated that by providing wide conductors 94, 96, 102 and 104, the present invention doubles the current-carrying capacity of thermal switch 90. This is advantageous when the capacitor is expected to carry a very large amount of current, for example 100 amperes, or more.

Figure 11A:
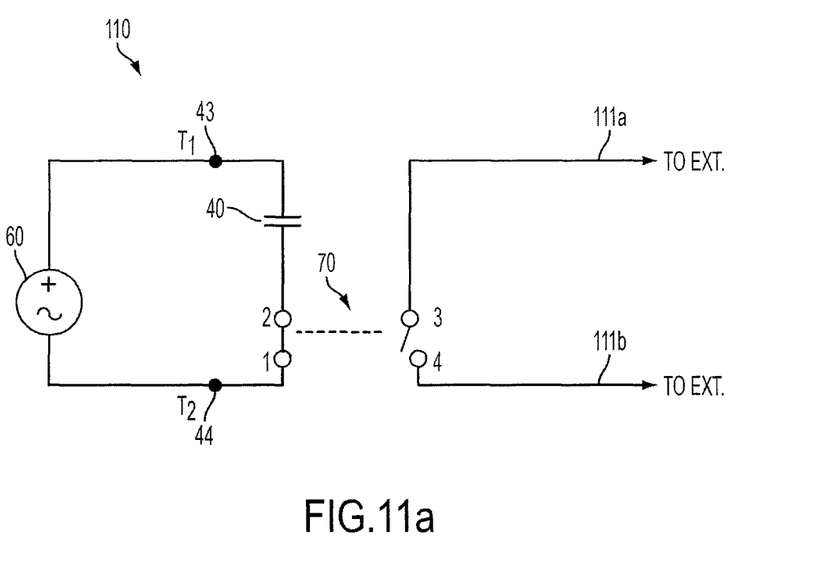
FIG. 11a is a schematic view of a double-pole double-throw thermal switch for simultaneously disconnecting an AC source and activating an external alert circuit, in accordance with an embodiment of the present invention.
Figure 11B:
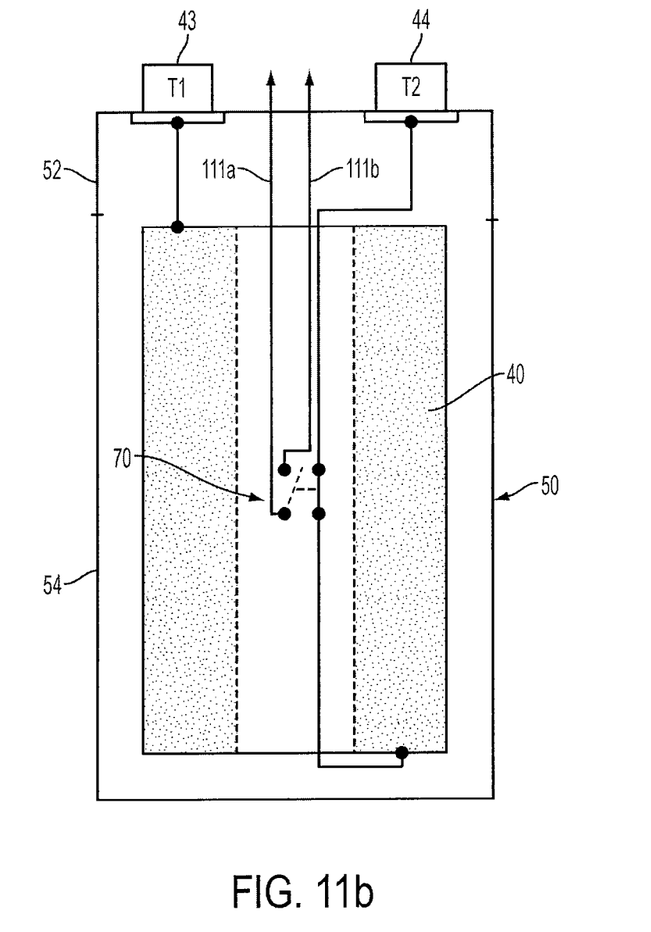
FIG. 11b is a cross sectional view of the double-pole double-throw thermal switch, shown schematically in FIG. 11a, when housed within upper and lower covers of an integral housing, for activating an external alert circuit, in accordance with an embodiment of the present invention.

Yet another embodiment of the present invention is shown in FIGS. 11*a* and 11*b*. The circuit 110, capacitor 40 and housing 50 are similar to circuit 65, capacitor 40 and housing 50 shown in FIGS. 7*a* and 7*b*. A difference between the two circuits, however, is that only thermal switch 70 is housed within the core of capacitor 40. Two conductor leads 111*a* and 111*b* are provided externally of housing 50. In this manner, a user may configure an alert circuit as individually desired. For example, a battery, an LED and a resistor may be connected to leads 111*a* and 111*b* as desired by the user. This provides additional flexibility in the manner that the present invention provides the external alert to the user.

It will be appreciated that upper cover 52 in FIG. 11*b* need not be translucent, since circuit 110 permits the user to configure an external alert indication as individually desired. The thermal switch 70 may include a micro-switch for activating the external alert to the user.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A capacitor providing a thermal alert comprising:
a wound film capacitor for carrying a large current when coupled to an AC generator, and the wound film capacitor including a hollow core extending from one end to another end of the capacitor,
a thermal switch disposed in the hollow core for sensing a predetermined temperature,
a light indicator coupled to the thermal switch,
a housing integrally formed from an upper cover and a lower cover for housing the wound film capacitor, the thermal switch and the light indicator, and
the upper cover of the housing formed from translucent material,
wherein the thermal switch is configured to disconnect the wound film capacitor from the AC generator upon reaching the predetermined temperature, and activate the light indicator to emit a light,
the upper cover is effective in transmitting the light from inside the housing to outside of the housing, and
the thermal switch includes a first end connected by a first conductor to the AC generator and a second end connected by a second conductor to the wound film capacitor, and the first and second conductors are strips of flexible metal for conducting a current of at least 50 amperes to the switch.

2. The capacitor of claim 1 wherein
the light indicator is disposed inside the housing and inside an interior portion of the upper cover.

3. The capacitor of claim 1 wherein
the light indicator includes an incandescent light bulb, a neon bulb, or a light emitting diode (LED).

4. The capacitor of claim 1 wherein
the light indicator is powered ON by the AC generator.

5. The capacitor of claim 1 wherein
the light indicator is powered ON by a DC battery.

6. The capacitor of claim 1 wherein
the thermal switch and the light indicator are fixed into positions within the housing by a translucent resin epoxy inserted into the housing.

7. The capacitor of claim 1 including
a reflector circumferentially positioned at a radial distance from the light indicator, wherein the reflector is effective in amplifying the light emitted from the light indicator.

8. The capacitor of claim 1 wherein
the first and second conductors include first double strips and second double strips, respectively, and the first double strips include first and second strip end portions,
the thermal switch includes first and second springing arms positioned to urge the first and second strip end portions, respectively, away from the second double strips, and
the first and second strip end portions are soldered to the second double strips,
wherein when the predetermined temperature is reached, the solder melts and the first and second strip end portions are urged away from the second double strips and disconnect the wound film capacitor from the AC generator.

9. The capacitor of claim 8 wherein
the first and second springing arms are formed from beryllium and have a width substantially equal to a width of the first double strips, and a length substantially in contact with a length of the first double strips.

10. The capacitor of claim 1 wherein
the thermal switch includes a double pole-double throw switch for disconnecting the wound film capacitor from the AC generator and activating the light indicator for emitting the light.

11. A bank of multiple capacitors providing a thermal alert comprising:
a bank of multiple wound film capacitors, each capacitor carrying a large current when coupled to an AC generator, and each capacitor including a hollow core extending from one end to another end of the capacitor,
a respective thermal switch disposed in the hollow core of each of the capacitors for sensing a predetermined temperature,
a respective light indicator coupled to the respective thermal switch, a respective housing integrally formed from an upper cover and a lower cover for housing each of the capacitors, each of the respective thermal switches and each of the respective light indicators, and
the upper cover of each of the respective housings formed from translucent material,
wherein each of the respective thermal switches is configured to disconnect a capacitor from the AC generator upon reaching the predetermined temperature, and
activate a respective light indicator to emit a respective light,
the upper cover of each of the respective housings is effective in transmitting the respective light from inside the respective housing to outside of the respective housing,
the multiple capacitors are electrically connected in at least one of series and parallel connections with the AC generator, and stacked into an array of the respective housings with the upper cover positioned vertically above the lower cover,
the upper cover of each of the respective housings is shaped as an inverted-U, or an inverted bucket, in cross-section,
a metallic plate is disposed vertically above the array, and
the shape of the upper cover permits viewing of an emitted respective light from a vertical position below the metallic plate and from a peripheral side of the array.

12. The bank of multiple capacitors of claim 11 wherein
the respective light indicator is disposed inside each of the respective housings and within an interior portion of each of the respective upper covers, and
the respective light indicator includes an incandescent light bulb, a neon bulb, or a light emitting diode (LED).

13. The bank of multiple capacitors of claim 11 wherein
the respective thermal switch and the respective light indicator inside each of the respective housings are fixed into positions by a translucent resin epoxy inserted into each of the respective housings.

14. The bank of multiple capacitors of claim 11 wherein
the respective thermal switch includes a first end connected by a first conductor to the AC generator and a second end connected by a second conductor to the respective capacitor,
the first and second conductors are wide strips of flexible metal for conducting a current of at least 50 amperes to the respective thermal switch, and the first and second conductors include first double strips and second double strips, respectively, and the first double strips include first and second strip end portions, and the respective thermal switch includes first and second springing arms positioned to urge the first and second strip end portions, respectively, away from the second double strips, and the first and second strip end portions are soldered to the second double strips, wherein when the predetermined temperature is reached, the solder melts and the first and second strip end portions are urged away from the second double strips and disconnect the respective capacitor from the AC generator, and the first and second strip end portions are soldered to the second double strips, wherein when the predetermined temperature is reached, the solder melts and the first and second strip end portions are urged away from the second double strips and disconnect the wound film capacitor from the AC generator.

15. A capacitor circuit connected to an AC source comprising:

at least one wound film capacitor for carrying a large current when coupled to the AC source, and the wound film capacitor including a hollow core extending from one end to another end of the capacitor, and the capacitor enclosed within a housing, a double-pole double-throw thermal switch disposed, in-line with the capacitor, and in the hollow core for sensing a predetermined temperature, two first terminals of the thermal switch operating in a normally closed position and having two first conductor leads configured to provide an AC voltage across the wound film capacitor, two second terminals of the thermal switch operating in a normally open position and having two second conductor leads extending externally from the housing of the wound film capacitor, wherein the two first terminals are configured to disconnect the wound film capacitor from the AC voltage upon reaching the predetermined temperature, and the two second terminals are configured to close for enabling a current to flow through the two second conductor leads and provide an external alert to a user; and an external indicator and an external power source connected to the two second conductor leads for providing the external alert to the user.

16. The capacitor circuit of claim 15 wherein the wound film capacitor is a first capacitor in a plurality of capacitors arranged in an array and connected to operate in parallel or in series with the AC source, and each of the plurality of capacitors includes a thermal switch having two first and two second terminals configured in a manner similar to the first capacitor.

17. The capacitor circuit of claim 15 wherein the thermal switch includes a micro-switch for activating the external indicator.

* * * * *